United States Patent
Chen et al.

(10) Patent No.: US 8,062,580 B2
(45) Date of Patent: Nov. 22, 2011

(54) APPARATUS FOR RECYCLING METAL FROM METAL IONS CONTAINING WASTE SOLUTION

(75) Inventors: Wen-Tsun Chen, Taoyuan (TW);
Shin-Chih Liaw, Taoyuan (TW);
Tao-Ming Liao, Taoyuan (TW);
Chia-Hung Shen, Taoyuan (TW);
Cheng-Hsien Lin, Taoyuan (TW)

(73) Assignee: Zhen Ding Technology Co., Ltd., Tayuan, Taoyuan (TW)

( * ) Notice: Subject to any disclaimer, the term of this patent is extended or adjusted under 35 U.S.C. 154(b) by 280 days.

(21) Appl. No.: 12/535,909

(22) Filed: Aug. 5, 2009

(65) Prior Publication Data
US 2010/0059910 A1    Mar. 11, 2010

(30) Foreign Application Priority Data
Sep. 8, 2008   (CN) ............................ 2008 1 0304420

(51) Int. Cl.
*C22B 3/02*       (2006.01)
(52) U.S. Cl. ......................................... 266/249; 75/743
(58) Field of Classification Search .................. 266/249; 75/743, 712
See application file for complete search history.

(56) References Cited

U.S. PATENT DOCUMENTS

| 4,830,750 | A | * | 5/1989 | Jandourek et al. | ............ 210/393 |
| 5,033,332 | A | * | 7/1991 | Riley | ............................ 266/249 |
| 5,246,486 | A | * | 9/1993 | Brierley et al. | .................. 75/743 |

FOREIGN PATENT DOCUMENTS
EP         522232 A2 *   1/1993

* cited by examiner

*Primary Examiner* — Scott Kastler
(74) *Attorney, Agent, or Firm* — Altis Law Group, Inc.

(57) ABSTRACT

An apparatus for recycling metals from metal ions containing waste solution includes a conveying device, a reducing agent supplier and a solution supplier. The conveying device includes a first ferromagnetic conveyor belt, a first roller, and a second roller. The first and second rollers are substantially horizontally arranged, and the second roller is arranged at a lower position relative to the first roller and spaced from the first roller. The ferromagnetic conveyor belt is wrapped around the first and second rollers. The reducing agent supplier is used for supplying a reducing agent onto the first conveyor belt, the ferromagnetic conveyor belt is capable of conveying the reducing agent from the second roller to the first roller. The solution supplier is configured for supplying the waste solution onto the first conveyor belt.

14 Claims, 4 Drawing Sheets

APPARATUS FOR RECYCLING METAL FROM METAL IONS CONTAINING WASTE SOLUTION

BACKGROUND

1. Technical Field

The present disclosure relates to an apparatus for recycling metal from metal ions containing waste solution, and more particularly, an apparatus for reducing metal ions contained in a waste solution to metal particles.

2. Description of Related Art

In a wet process of manufacturing printed circuit boards, electrical traces are formed from copper layer on a printed circuit board substrate (e.g., a copper clad laminate) using an etchant, which results in oxidization of a majority portion of the copper layer into copper ions. The copper ions accumulate in the etchant. When a concentration of the copper ions in the etchant exceeds a certain value, the etchant cannot be used again. In other words, the etchant becomes a copper ions containing waste solution. In addition, except for waste solution discussed above, there are a variety of waste solutions containing a variety of other metal ions (e.g., silver ions, gold ions or other noble metal ions) produced in manufacturing of various industrial products. For purpose of extracting and reusing metals in these waste solutions and avoiding environmental pollution, it is necessary to provide an apparatus for recycling metal ions contained in these waste solutions.

BRIEF DESCRIPTION OF THE DRAWINGS

Many aspects of the apparatus for recycling metal ions contained in a waste solution can be better understood with reference to the following drawings. The components in the drawings are not necessarily drawn to scale, the emphasis instead being placed upon clearly illustrating the principles of embodiments. Moreover, in the drawings, like reference numerals designate corresponding parts throughout the different views.

DETAILED DESCRIPTION

Figure 1:
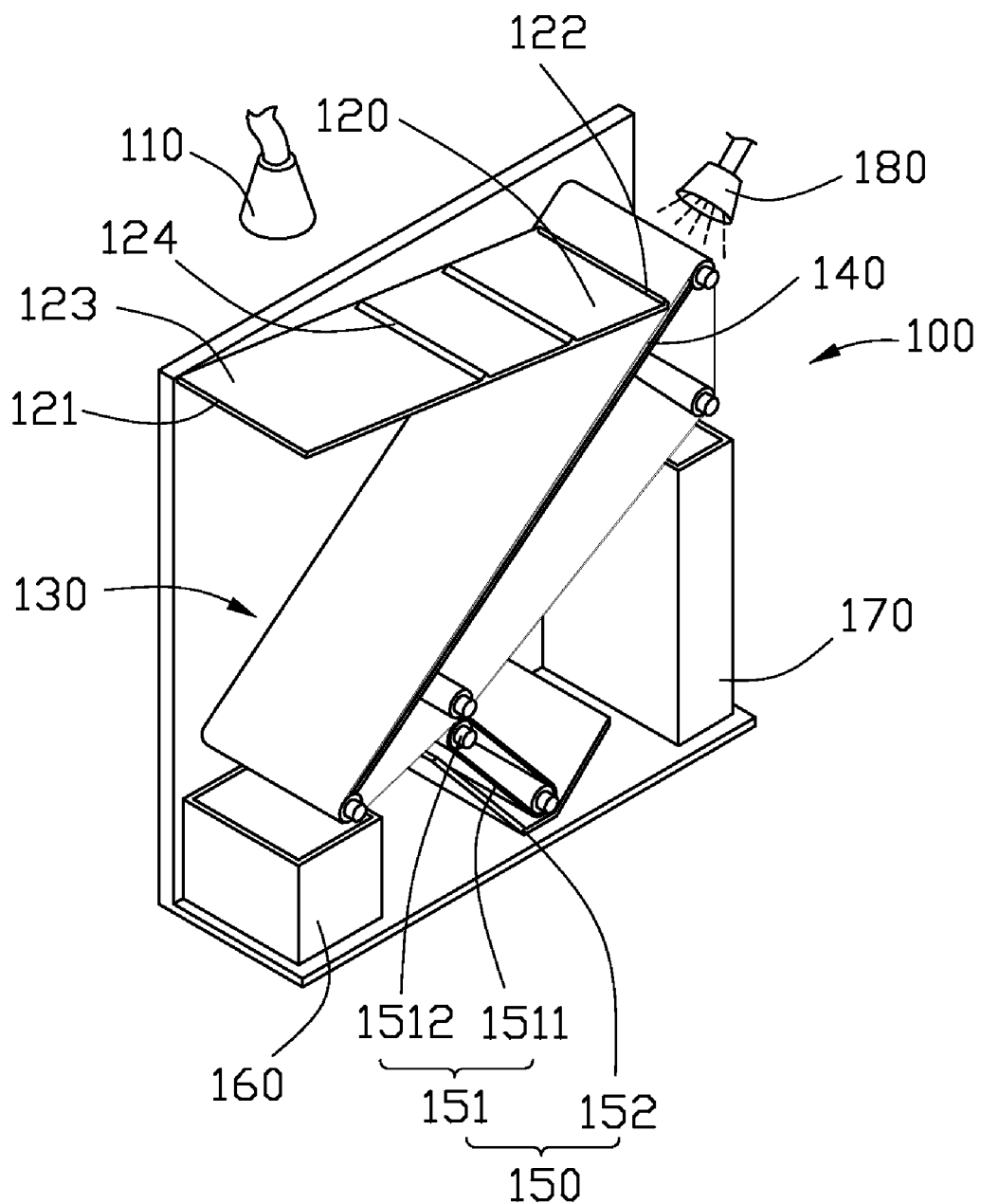
FIG. 1 is an isometric view of an apparatus for recycling metal ions contained in a waste solution in accordance with a first embodiment.
Figure 2:
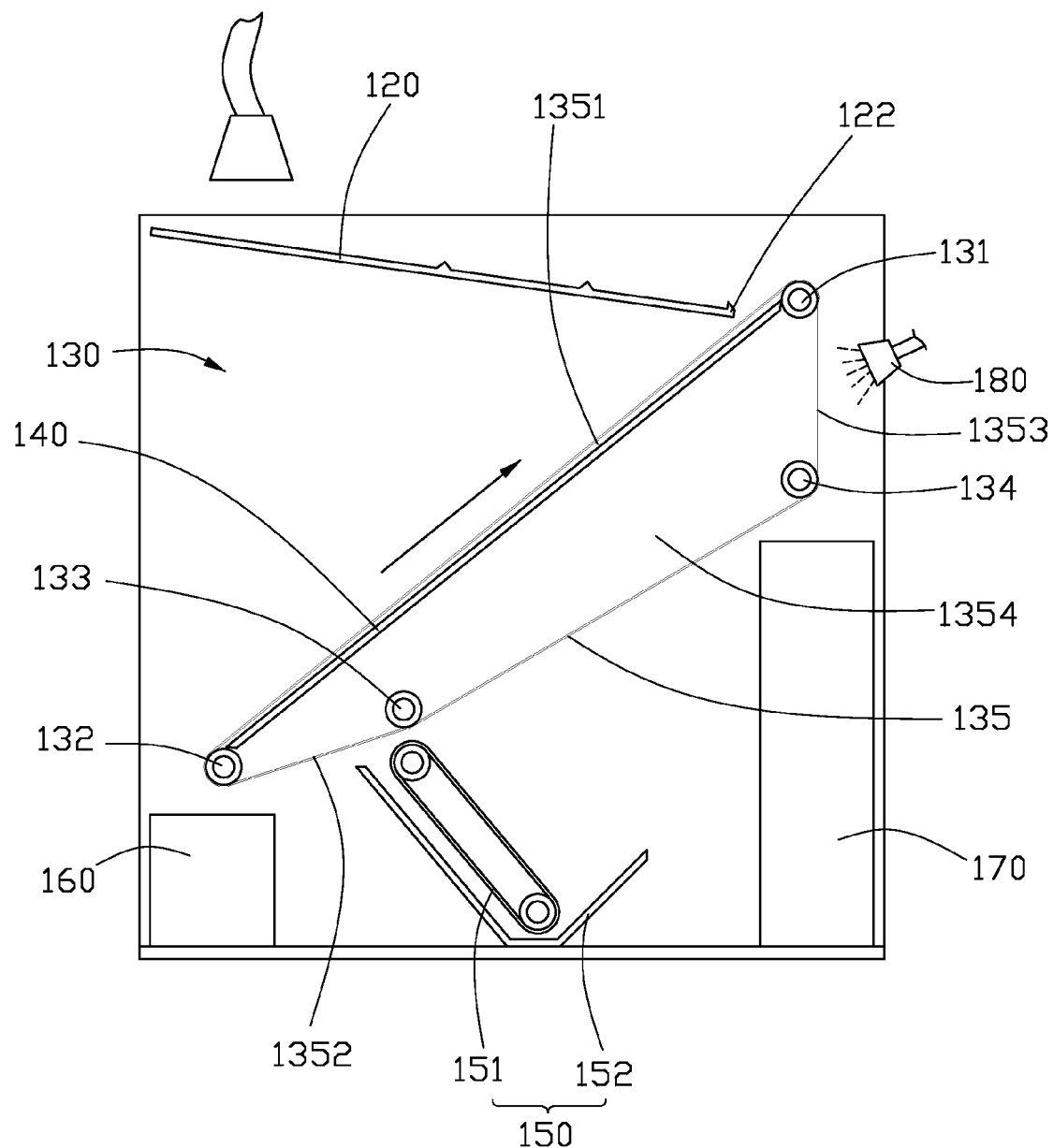
FIG. 2 is a side view of the apparatus shown in FIG. 1.

Referring to FIGS. 1-2, an apparatus 100 for recycling metal ions contained in a waste solution includes a waste solution supplier 110, a flow guiding member 120, a first conveying device 130, a cooling member 140, a reducing agent supplier 150, a first container 160, a second container 170 and a scraping member 180.

The solution supplier 110 is arranged over and faces the flow guiding member 120, configured for spraying a waste solution onto the flow guiding member 120. In another embodiment, the solution supplier 110 contacts the flow guiding member 120. For the purpose of accurately controlling a flow of the waste solution applied onto the flow guiding member 120, the solution supplier 110 can be equipped with a flow controlling device such as a flowmeter.

The flow guiding member 120 is rectangle board shaped, installed in an inclined manner at an acute angle relative to the first conveyor belt. A first end 121 thereof is opposite to the solution supplier 110 and a second end 122 thereof is adjacent to the first conveying device 130. The flow guiding member 120 has a surface 123 facing the solution supplier 110 and allowing a waste solution to be sprayed, and three baffle protrusions 124 arranged widthwise on the surface 123 (i.e., perpendicular to a flow direction of the waste solution). The three baffle protrusions 124 are spaced from and parallel to each other. In such way, the flowing speed of the solution on the flow guiding member 120 is reduced by the baffle protrusions 124 when the solution flowing from the first end 121 toward the second end 122, then overflows the baffle protrusions 124 and flows onto the first conveying device 130 with uniform flux density along entire width of the flow guiding member 120 under gravity.

The first conveying device 130 includes a first roller 131, a second roller 132, a third roller 133, a fourth roller 134 and a first ferromagnetic conveyor belt 135. All the rollers 131, 132, 133, 134 are substantially horizontally arranged. The second, third, fourth rollers 132, 133, 134 are at a lower position relative to the first roller 131, and the second, third rollers 132, 133 are spaced from the first roller 131 in the horizontal direction, the fourth roller 134 is perpendicular to the first roller 31. The first conveyor belt 135 surrounds the four rollers, cooperates with the four rollers defining a cross-sectional quadrangle shaped space 1354. Accordingly, the first conveyor belt 135 has a first portion 1351 between the first and second rollers 131, 132, a second portion 1352 between the second and third rollers 132, 133, and a third portion 1353 between the first and fourth rollers 131, 134. The first portion 1351 faces the flow guiding member 120 and forms an acute angle with the second end 122 of the flowing guiding member 120. Therefore, the waste solution can flow along the first portion 1351 and fall into the first container 160 under gravity. Alternatively, the flow guiding member 120 can be omitted, the solution supplier 110 is adjacent to the first roller 131. In this situation, the waste solution is directly sprayed onto the first portion 1351. Additionally, the third roller 133 can be omitted, the other three rollers and the first conveyor belt 135 cooperatively defines a cross-sectional triangle shaped space, and a portion of the first conveyor belt 135 between the second and fourth rollers 132, 134 is defined as the second portion 1352.

The first container 160 is under the second roller 132, and is configured for collecting waste solution drops from the first portion 1351. The second container 170 is under the third portion 1353 of the first conveyor belt 135, and is used for collecting metals reduced from the waste solution. The scraping member 180 faces the third portion 1353 of the conveyor belt 135, and is configured for removing metals attached on the conveyor belt 135. In the present embodiment, the scraping member 180 is a water sprayer for flushing the metals into the second container 170. Alternatively, the scraping member 180 can be a scraping tool.

The cooling member 140 is received in the space 1354 and adjacent to the first portion 1351 of the first conveyor belt 135, and is used for cooling the first portion 1351, thereby keeping a temperature of the first portion 1351 at a predetermined level.

The reducing agent supplier 150 is between the first and second containers 160, 170, and under the first convey belt 135, used for applying reducing agent onto the first conveyor belt 135. In the present embodiment, the reducing agent supplier 150 includes a container 152 for accommodating the reducing agent and a second ferromagnetic conveying device 151 including a second ferromagnetic conveyor belt 1512 and two rollers 1511. One end of the second conveying device 151 is received in the container 152, and another end of the second conveying device 151 is adjacent to the second portion 1352 of the conveyor belt 135. In such manner, the second conveying device 151 ferromagnetically attracts the reducing agent received in the container 152 and when the reducing agent moves near to the second portion 1352, the reducing agent is attracted onto the second portion 1352 of the conveyor belt 130.

A working process of the apparatus 100 will be described as follow, taking reducing copper ions in waste solution using iron powder as a reducing agent as an example.

A waste solution containing copper ion is applied onto the flow guiding member 120 using the solution supplier 110, and an iron powder is ferromagnetically attracted and transmitted using the second conveying device 151. When the iron powder attracted on the conveying device 151 get close to the second portion 1352 of the first conveyor belt 135, the iron powder is magnetically adsorbed onto the second portion 1352 of the first conveyor belt 135 due to a ferromagnetic force generated by the second portion 1352 being larger than that generated by the second conveyor belt 1511. Thereafter, the waste solution flows onto the first portion 1351 of the first conveyor belt 135 under guiding of the flow guiding member 120, the iron powder arrives at the first portion 1351. When the waste solution meets with the iron powder, an oxidation-reduction reaction is occurred, thereby obtaining a mixture of iron powder shelled with copper particles. When the mixture is transmitted between the first roller 131 and the fourth shaft 134, the mixture is scraped using the scraping member 180 and fall into the second container 170.

Figure 3:
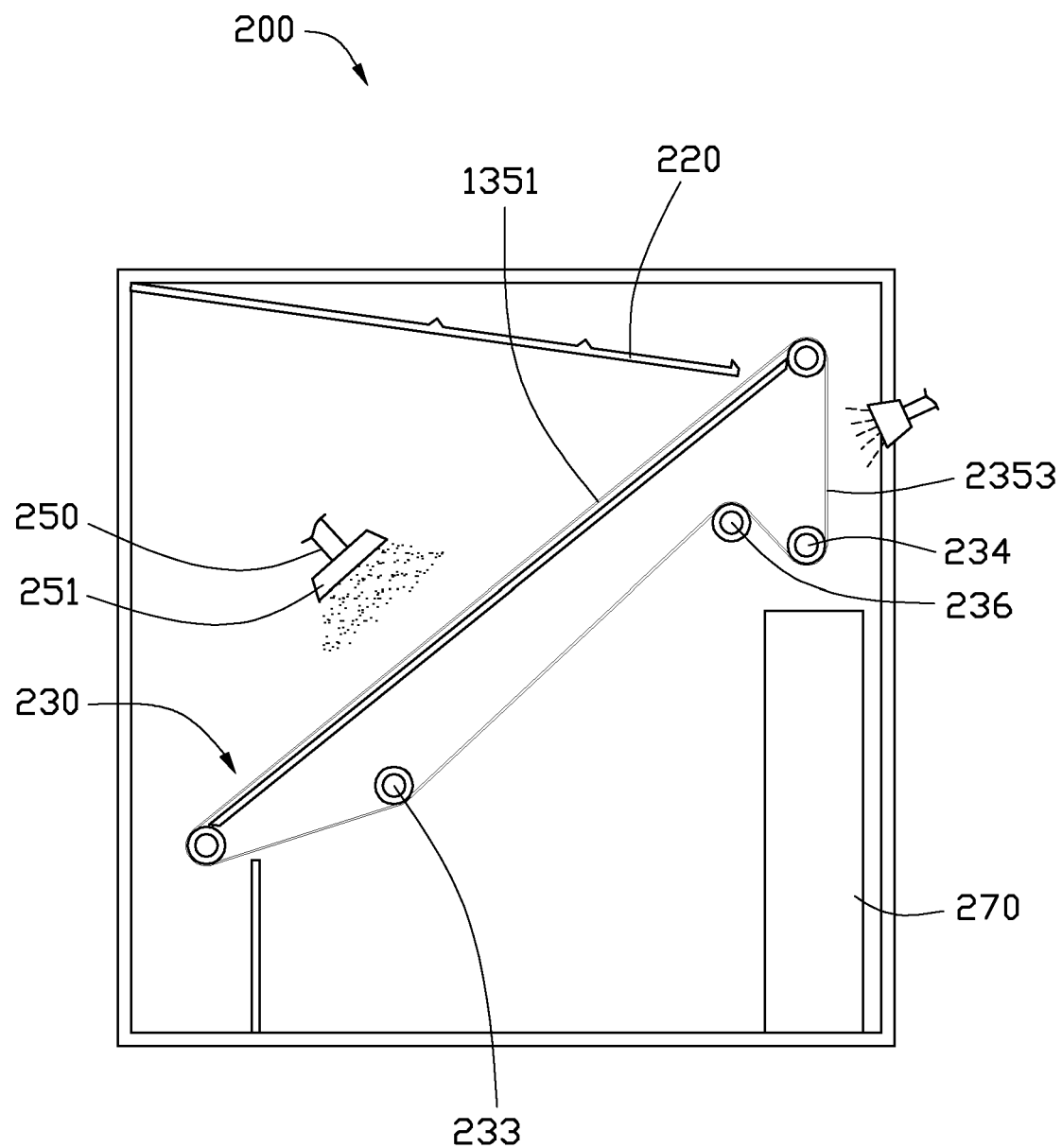
FIG. 3 is a side view of an apparatus for recycling metal ions contained in a waste solution in accordance with a second embodiment.

Referring to FIG. 3, another apparatus 200 for recycling metals from a metal ions containing waste solution provided in a second embodiment differs the apparatus 100 in that the reducing agent supplier 250 is a spraying member disposed between the flow guiding member 220 and the first conveying device 230. The reducing agent supplier 250 has a nozzle 251 facing the first portion 2351 of the first conveyer belt 235, and the nozzle 251 is configured for spraying reducing agent directly onto the first portion 2351. The first conveying device 230 further includes a fifth roller 236 fixed between the fourth, third rollers 234, 233. The fifth roller 236 is closer to the first portion 2351 than the fourth roller 234. Hence, the product attracted on the third portion 2353 is prevented being transmitted between the fourth and third rollers 234, 233 and can completely fall into the second container 270.

Figure 4:
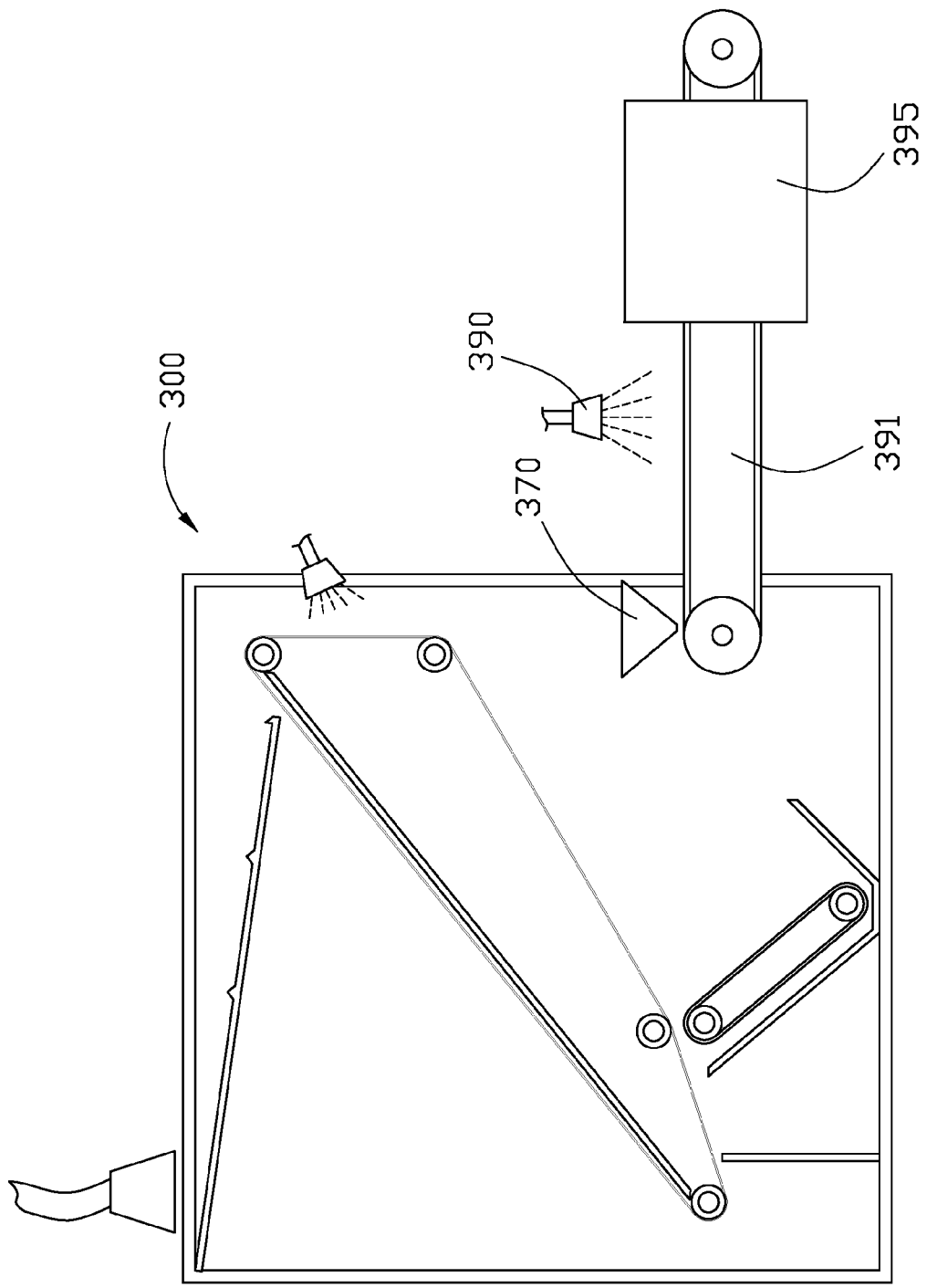
FIG. 4 is a side view of an apparatus for recycling metal ions contained in a waste solution in accordance with a third embodiment.

Referring to FIG. 4, another apparatus 300 for recycling metals from a metal ions containing in waste solution provided in a third embodiment differs from the apparatus 100 in that the apparatus 300 further includes a washing member 390, a third conveying device 391 and a drying member 395. In the present embodiment, the second container 370 is a funnel. The third conveying device 391 is disposed under the second container 370 and the washing member 390, and passes through the drying member 395. In this manner, the product falls onto the third conveying device 391 via the second container 370 and then is transmitted into the drying member 395 after being washed by the washing member 390.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. An apparatus for recycling metals from metal ions containing waste solution, comprising:
   a conveying device including a first ferromagnetic conveyor belt, a first roller, and a second roller, the first and second rollers being substantially horizontally arranged, and the second roller being arranged at a lower position relative to the first roller and spaced from the first roller, the ferromagnetic conveyor belt wrapping around the first and second rollers;
   a reducing agent supplier for supplying a reducing agent onto the first conveyor belt, the ferromagnetic conveyor belt being capable of conveying the reducing agent from the second roller to the first roller;
   a flow guiding member having a surface for solution to flow thereon and a protrusion formed on the surface for reducing flowing speed of the solution; and
   a solution supplier configured for supplying the waste solution onto the flow guiding member, the flow guiding member disposed between the solution supplier and the first conveyor belt.

2. The apparatus of claim 1, wherein the flow guiding member is adjacent to the first conveyor belt and is inclined at an acute angle relative to the first conveyor belt.

3. The apparatus of claim 1, wherein a flow direction of the solution on the first conveyor belt is opposite to a conveying direction of the reducing agent.

4. The apparatus of claim 1, wherein the solution supplier and the reducing agent supplier are disposed at opposite sides of the first conveyor belt.

5. The apparatus of claim 1, wherein the reducing agent supplier includes a second ferromagnetic conveyor belt adjacent to the first conveyor belt for attracting and conveying reducing agent, and a ferromagnetic force generated by the first conveyor belt is larger than that generated by the second conveyor belt.

6. The apparatus of claim 1, further comprising a scraping member for removing the product from the first conveyor belt.

7. The apparatus of claim 1, further comprising a washing member for washing the product.

8. The apparatus of claim 1, further comprising a drying member for drying the product.

9. An apparatus for recycling metals from metal ions containing waste solution, comprising:
   a conveying device including a first ferromagnetic conveyor belt, a first roller, and a second roller, the first and second rollers being substantially horizontally arranged, and the second roller being arranged at a lower position relative to the first roller and spaced from the first roller, the ferromagnetic conveyor belt wrapping around the first and second rollers;
   a reducing agent supplier for supplying a reducing agent onto the first conveyor belt, the ferromagnetic conveyor belt being capable of conveying the reducing agent from the second roller to the first roller;
   a flow guiding member having a surface for solution to flow thereon and a plurality of protrusions widthwise extending on the surface for reducing flowing speed of the solution, the protrusions spaced from and parallel to each other; and
   a solution supplier configured for supplying the waste solution onto the flow guiding member, the flow guiding member disposed between the solution supplier and the first conveyor belt.

10. The apparatus of claim 9, wherein the reducing agent supplier includes a second ferromagnetic conveyor belt adjacent to the first conveyor belt for attracting and conveying reducing agent, and a ferromagnetic force generated by the first conveyor belt is larger than that generated by the second conveyor belt.

11. The apparatus of claim 9, wherein the flow guiding member is adjacent to the first conveyor belt and is inclined at an acute angle relative to the first conveyor belt.

12. The apparatus of claim 9, wherein a flow direction of the solution on the first conveyor belt is opposite to a conveying direction of the reducing agent.

13. The apparatus of claim 9, wherein the solution supplier and the reducing agent supplier are disposed at opposite sides of the first conveyor belt.

14. An apparatus for recycling metals from metal ions containing waste solution, comprising:
   a conveying device including a first ferromagnetic conveyor belt, a first roller, and a second roller, the first and second rollers being substantially horizontally arranged, and the second roller being arranged at a lower position relative to the first roller and spaced from the first roller, the ferromagnetic conveyor belt wrapping around the first and second rollers;
   a reducing agent supplier for supplying a reducing agent onto the first conveyor belt, the ferromagnetic conveyor belt being capable of conveying the reducing agent from the second roller to the first roller, the reducing agent supplier including a second ferromagnetic conveyor belt adjacent to the first conveyor belt for attracting and conveying reducing agent, a ferromagnetic force generated by the first conveyor belt being larger than that generated by the second conveyor belt; and
   a solution supplier configured for supplying the waste solution onto the first conveyor belt.

* * * * *